United States Patent [19]
Geier

[11] Patent Number: 5,454,488
[45] Date of Patent: Oct. 3, 1995

[54] APPARATUS FOR DISPENSING A SEMIFLUID MEDIUM FROM A CONTAINER

[75] Inventor: Adalberto Geier, Calceranica al Lago, Italy

[73] Assignee: Coster Technologie Speciali SpA Stabilimento di Calceranica, Italy

[21] Appl. No.: 159,182

[22] Filed: Nov. 24, 1993

[30] Foreign Application Priority Data

Nov. 24, 1992 [DE] Germany ............................. 42 39 468.6
Mar. 11, 1993 [DE] Germany ............................. 43 07 752.8

[51] Int. Cl.⁶ ................................................. B65D 35/14
[52] U.S. Cl. .......................... 222/95; 222/214; 222/494; 222/383.3; 222/541.1
[58] Field of Search ................................. 222/207, 209, 222/212, 214, 95, 105, 383, 490, 494, 386.5, 107

[56] References Cited

U.S. PATENT DOCUMENTS

| | | | |
|---|---|---|---|
| 4,162,030 | 7/1979 | Capra et al. | 222/386.5 X |
| 4,913,322 | 4/1990 | Stöffler et al. | 222/207 |
| 4,946,076 | 8/1990 | Hackmann et al. | 222/207 |
| 5,242,085 | 9/1993 | Richter et al. | 222/105 |
| 5,271,432 | 12/1993 | Gueret | 222/207 X |
| 5,332,121 | 7/1994 | Schmidt et al. | 222/105 X |

FOREIGN PATENT DOCUMENTS

| | | | |
|---|---|---|---|
| 3432253 | 3/1986 | Germany | 222/95 |
| 2083142 | 3/1982 | United Kingdom | 222/209 |
| 2210112 | 6/1989 | United Kingdom | 222/207 |
| 8301431 | 4/1983 | WIPO | 222/95 |

*Primary Examiner*—Andres Kashnikow
*Assistant Examiner*—Lisa Douglas
*Attorney, Agent, or Firm*—Andrus, Sceales, Starke & Sawall

[57] ABSTRACT

An apparatus for dispensing a semifluid medium such as a pasty mass, cream, gel or the like, from a container comprises a manually operated dosing pump connected to the container. The dosing pump itself comprises a pump body which is attached to a rim of the container opening and defines a pump chamber, the volume of which can be changed from outside. The pump chamber communicates on its input side with the interior of the container by way of a non-return valve that opens in the direction of the pump chamber and on its output side with the exterior by way of a delivery outlet. The container is also provided in its interior with a flexible bag for holding the semifluid medium. The bag is connected to the container in the region of the container opening.

16 Claims, 4 Drawing Sheets

5,454,488

APPARATUS FOR DISPENSING A SEMIFLUID MEDIUM FROM A CONTAINER

FIELD OF THE INVENTION

The present invention relates to an apparatus for dispensing a semifluid medium, such as a pasty or highly viscous mass, cream or gel, from a container.

DESCRIPTION OF THE PRIOR ART

Conventional dispensing apparatus comprise a container with a container opening to which a manually operated dosing pump is attached, The dosing pump includes a pump body that can be fixed to the rim of the container opening, with a pump chamber, the volume of which is alterable from outside. The pump chamber communicates at its input with the interior of the container, by way of a non-return valve that opens in a direction toward the pump chamber, and at its output with the exterior by way of a delivery outlet.

However, it has proved disadvantageous in these apparatus that no means are provided to prevent contact between the semifluid medium and surrounding surfaces and the exterior. The semifluid medium may therefore deteriorate relatively rapidly. Another disadvantage of these apparatus is that they cannot be completely emptied. Usually a not inconsiderable remnant of the semifluid medium remains in the container. Finally, the known apparatus have the further disadvantage of elaborate construction, which makes the cost of their manufacture and assembly relatively high.

SUMMARY OF THE INVENTION

The object of the present invention is to provide a dispensing apparatus wherein contact between the semifluid medium and surrounding surfaces and the exterior is entirely or at least substantially prevented so that the semifluid medium will keep for a longer time; which can be completely or at least nearly completely emptied of the semifluid medium; and which is of a simple construction that can be inexpensively assembled.

According to the present invention there is provided an apparatus for dispensing a semifluid medium comprising a container for said semifluid medium with a rim defining an opening, a flexible bag lining said container to receive the semifluid medium and attached to said container adjacent said rim, a manually operable dosing pump comprising a pump body which defines a pump chamber, an inlet and a delivery outlet and which is attachable to said rim of the container, said pump chamber defining a volume which can be changed by forces acting from the exterior of said apparatus and which communicates with the exterior of said apparatus by way of said delivery outlet, and a non-return valve which is located between said inlet of the pump chamber and the interior of said bag and which opens in a direction towards said pump chamber.

In the invention, the flexible bag which receives the semifluid medium ensures that there can be no contact between the semifluid medium and surrounding surfaces so that the semifluid medium will keep for a long time. In addition, this arrangement ensures that all or substantially all the semifluid medium can be discharged from the container. Finally, this apparatus is of simple construction, so that the costs of manufacture and assembly are very low.

Preferably, the flexible bag is attached to an inner surface of the container by at least part of its outer surface in such a way that as it empties it detaches itself from the inner surface of the container.

Preferably also, at least a part of the exterior bottom surface of said bag is in communication with the exterior of said apparatus.

Preferably also, said container defines an air intake channel which communicates with said exterior bottom surface of the bag and which forms an air intake opening defined by an exterior surface of said container.

These features facilitate inward collapsing of the bag due to the relatively low pressure that develops within it as it is progressively emptied of the semifluid medium. The external air pressure therefore reinforces the contraction of the flexible bag when the pump is activated to dispense the contents of the bag.

Preferably also, the flexible bag is impermeable to at least one of water and gas. This ensures that the semifluid medium contained within the flexible bag will keep until the bag is almost completely empty.

Preferably also, the flexible bag is made of a plastics material and comprises at least one sheet-like layer. In particular, the flexible bag preferably comprises three sheet-like layers, the innermost layer being made of a polyethylene terephthalate compound, the middle layer being made of ethylvinyl alcohol, and the outermost layer being made of polyethylene. Such a laminated structure on the one hand reliably prevents passage of water and gas, especially $O_2$, through the bag and, on the other hand, enables the bag to be welded to the container in the region of the container opening.

Preferably also, the dosing pump comprises a cap operating means, a closure means for said container opening in which said non-return valve is located, and a diaphragm which is located between the cap operating means and the closure means and which can be moved relative to the closure means by way of the cap operating means.

Preferably also, said diaphragm and said closure means together define said pump chamber and a delivery channel which connects said pump chamber to said delivery outlet.

Preferably also, the cap operating means, the closure means and the diaphragm are attached together to form a single assembly unit of the apparatus.

These features make the apparatus of simple construction with associated low assembly costs.

Preferably also, the diaphragm is integrally formed with a cylindrical sleeve which extends outwardly through the cap operating means and which defines said delivery outlet at its outer end, and the closure means comprises a cylindrical projection which extends outwardly through the cap operating means and which is enclosed by said cylindrical sleeve.

Preferably also, the cylindrical projection defines comprises a longitudinal channel at its outer periphery that constitutes a connection between said delivery outlet and said delivery channel that connects the pump chamber to the delivery outlet.

Preferably also, the cylindrical projection defines an annular bevel, and said cylindrical sleeve comprises an annular flap located at said outer end and bounding said delivery outlet, the annular flap cooperating with said annular bevel to defines therebetween an annular delivery aperture.

These features make it possible for the portion of semifluid medium remaining in the dosing pump and the flexible bag to be securely sealed off from the exterior, and allow the semifluid medium to be wiped off from the delivery outlet of the dosing pump in a highly convenient and complete manner.

Preferably also, the cap operating means comprises a cap portion and an operating key which is attached to said cap portion by an integral coupling, and a frangible strip is disposed between said cap portion and said operating key substantially diametrically opposite said coupling so that it can break away from at least one of the cap portion and the operating key when said operating key is depressed on first use of the apparatus.

This frangible strip thus acts as a security device which indicates, when unbroken, that the apparatus has not been used previously.

Further features, advantages and details of the invention will become apparent from the following description of some preferred embodiments of the invention with reference to the accompanying drawings.

DESCRIPTION OF THE PREFERRED EMBODIMENTS

Figures 1, 2:
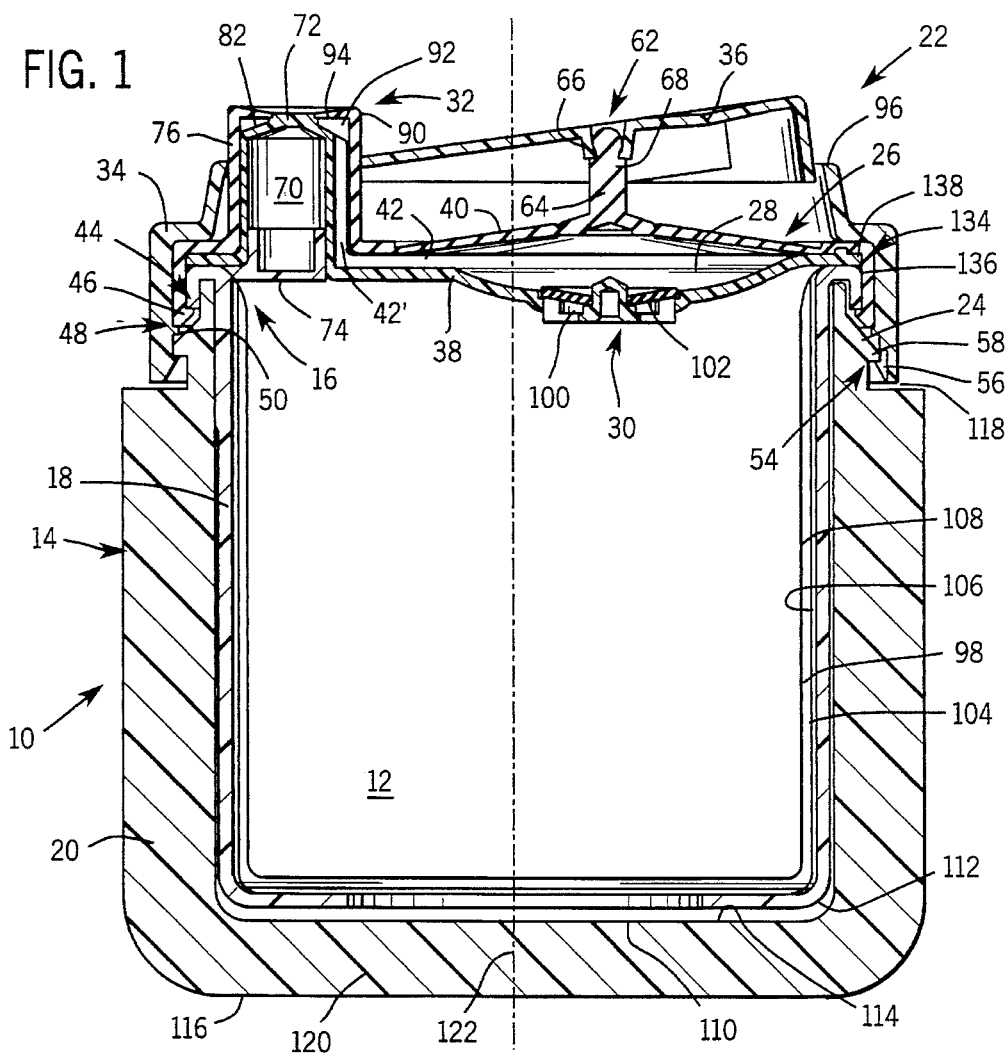
FIG. 1 is a longitudinal cross section of a first embodiment of a dispensing apparatus according to the present invention before it has been put into use.
FIG. 2 is a plan view, partially cut-off, of the embodiment shown in FIG. 1.

The apparatus 10 shown in FIG. 1 serves to store and to dispense a semifluid medium 12, in particular a pasty or highly viscous mass such as cosmetic or pharmaceutical pastes, creams, gels or the like, which should not come into contact with the exterior or air.

The apparatus 10 comprises a container 14 with an opening 16. As shown in FIG. 1, the container 14 comprises an inner shell 18 and an outer shell 20 either or both of which can be made of glass, glass substitute, plastics or similar material.

Attached to the container opening 16 is a manually operated dosing pump 22, which has a pump body 26 that is attached to the rim 24 of the container opening 16. The pump body 26 defines a pump chamber 28, the volume of which can be altered from outside the chamber. The pump chamber 28 communicates on its input side with the interior of the container 14, by way of a non-return valve 30 that opens in a direction toward the pump chamber 28, and on its output side with the exterior, by way of a delivery outlet 32.

The dosing pump 22 comprises a cap element 34 with an integrally coupled operating key 36, a lid-like closure element 38 associated with the container opening 16 and incorporating the non-return valve 30, and a flexible diaphragm 40 positioned at the closure element 38. The diaphragm 40 is connected to the operating key 36 such that it can be moved toward or away from the closure element 38. With this arrangement the dosing pump 22 serves simultaneously as a lid for the container 14, closing the container opening 16.

As shown in FIG. 1, the cap element 34 encloses and holds in place the diaphragm 40 and the closure element 38, which delimit between them the pump chamber 28 and a delivery channel 42 that connects the pump chamber 28 with the delivery outlet 32. The delivery channel 42 itself has only a small diameter, to minimize the amount of air it contains both before the apparatus is first used and thereafter in accordance with the invention.

The lid-like closure element 38 is fixed to the diaphragm 40 or to the component that retains the diaphragm 40 along its circumferential edge by a catch or snap-fit device 134 or an equivalent. In this particular embodiment, the device 134 comprises an annular ridge 136 extending radially inward, which is in an interlocking functional engagement with the circumferential edge of the lid-like closure element 38.

The diaphragm 40 in turn is fixed to the cap element 34, again along its circumferential edge, by a catch, snap-fit or equivalent device 48. The device 48 likewise comprises a radially inward-projecting annular ridge 50, by which the diaphragm 40 is fixed to the cap element 34 in an interlocking, snapping or similar manner.

Again in this embodiment the entire dosing pump 22 is fixed to the container 14, in particular in the region of the container opening 16, by a snap-fit or equivalent device 54. For this purpose the cap element 34 is provided with a locking, snapping or equivalent projection or lip 56 that projects radially inward. The projection or lip 56 is brought into functional engagement, in an interlocking, snap-fit or similar manner, with an outwardly projecting annular ridge 58 on the container 14. Alternatively, the dosing pump 22 can be fixed by screwing the cap element 34 onto an external screw thread formed at the edge of the container opening, i.e. at the upper rim of the outer shell 20 of the container 14.

In this first embodiment yet another catch connection is provided, between the inner shell 18 or the rim of its opening 44 and the circumferential edge of the component surrounding the diaphragm 40. For this purpose a radially inward-projecting annular ridge 46 is provided at said circumferential edge. Thus the inner shell 18 plus a flexible bag 98 to receive the semifluid medium 12, as is described below, and the dosing pump 22 constitute an assembly, which can be fixed to the outer shell 20 of the container by way of the catch connection 54. As explained above, the catch connection 54 can be replaced by a screw connection. As a result, the producer of the medium with which the container is to be filled can receive from the manufacturer of the present apparatus the components 34, 38 and 40 in a pre-assembled state as well as the inner shell 18 together with the bag 98. The outer shell 20 varies in its external appearance according to the requirements of the producer of the medium, and as a rule is provided by the producer of the medium. The outer shell 20 must of course be of a configuration suitable for attachment to the dosing pump 22 and for insertion of the inner shell 18.

The diaphragm 40 is connected to the operating key 36, which is integrally coupled to the cap element 34 in the region 60. In particular, the diaphragm 40 is connected to the cap element 34 by a catch, snap-fit or equivalent means 62.

As shown in FIG. 1, the means 62 provided to connect the operating key 36 and the diaphragm 40 is a spigot or peg 64, which projects substantially perpendicularly from the upper surface of the diaphragm 40, into a socket or receptacle 66 which is disposed on the lower surface of the operating key 36 and is provided with a complementary catch, snap-fit or equivalent means. Hence the free upper end 68 of the spigot 64 can engage the catch, snap-fit or equivalent means in the receptacle 66 to connect the flexible membrane 40 to the operating key 36.

Figure 3:
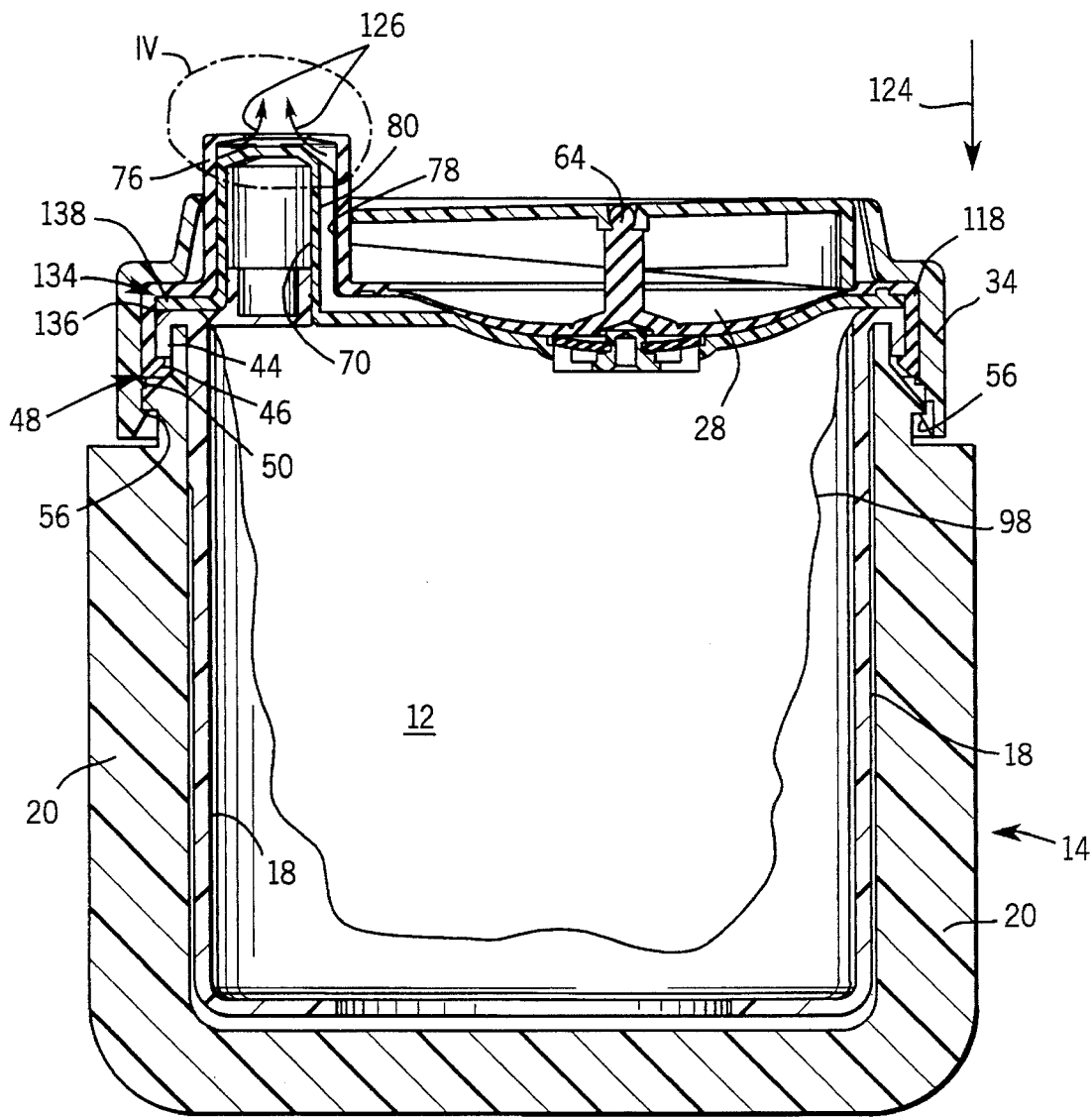
FIG. 3 is longitudinal cross section similar to FIG. 1 of the apparatus in an open position after it has been put into use.

The effect of this arrangement is to couple the volume of the pump chamber 28 to the movement of the operating key 36. Accordingly, when the dosing pump 22 is in a closed position, i.e. with the operating key 36 raised as shown in FIG. 1, the volume of the pump chamber 28 can be considered as equivalent to the value 1, whereas with the dosing pump 22 in a delivery position, i.e. with the operating key 36 depressed as shown in FIG. 3, the volume of the pump chamber approaches a value 0.

To enable such relative movement between the diaphragm 40 and the lid-like closure element 38, for alteration of the volume of the pump chamber 28 delimited by these components, the diaphragm 40 is made of a resiliently deformable plastic material, in particular rubber or the like, whereas the closure element 38 is made of a substantially rigid plastics or equivalent material. Furthermore, the diaphragm 40 in the region of the pump chamber 28 and/or the operating key 36 in its coupling region 60 is formed so as to be spring biased in the direction of the closed position of the dosing pump 22. This spring biasing facilitates movement of the diaphragm 40 from the delivery position into the closed position and thus the associated movement of the operating key 36 from a depressed to an elevated position.

As shown in FIG. 1, the closure element 38 bears a cylindrical projection 70 that extends outward through the cap element 34. The cylindrical projection 70 of the closure element 38 is closed at its outer end. In this embodiment, the projection 70 is closed at both ends, at one end by an integral end wall 72 and at the other by an interior stopper 74. The stopper 74 prevents the inclusion of air, which could have a deleterious effect on the semifluid medium 12 contained in the container 14. Rather than by the stopper 74, the projection 70 could also be closed off by an interior end wall formed as an integral part of the closure element 38.

The projection 70 is enclosed in an outer sleeve 76, formed integrally with the diaphragm 40 or with the component enclosing the diaphragm 40. The sleeve 76 also extends through the cap element 34. At the free end of the sleeve 76 the delivery outlet 32 is disposed.

To provide a continuation of the delivery channel 42 to the delivery outlet 32, on the outer surface of the cylindrical projection 70 there is a longitudinal channel 42'. Alternatively, the longitudinal channel could be formed on the inner surface of the sleeve 76 surrounding the projection 70. Apart from the grooved section, the inside diameter 78 of the sleeve 76 is about the same as the outside diameter 80 of the projection 70 so it has a clearance fit.

Figure 4:
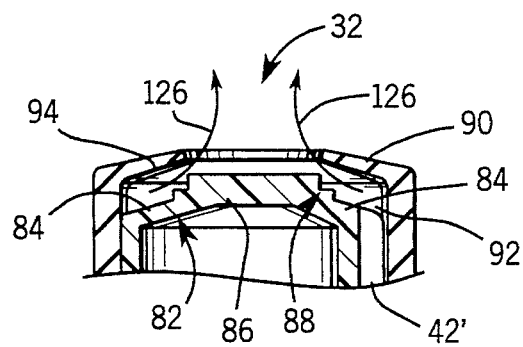
FIG. 4 is a longitudinal cross section to a larger scale through part of the apparatus indicated by the outline IV in FIG. 3.

The end wall 72 at the free upper end of the cylindrical projection 70 of the closure element 38 has an annular beveling 82. Hence at the outer circumference of the end wall 72 there is a conical annular surface 84 (see FIGS. 4 and 6). In the first embodiment, the conical annular surface 84 is separated from a circular central surface 86 by an annular step 88.

Together with an annular closing flap 90, which is formed at the free edge of the cylindrical sleeve 76 and bounds the delivery outlet 32 of the dosing pump 22, the annular surface 84 constitutes an annular delivery channel 92. The latter communicates with the delivery channel 42 and hence with the pump chamber 28 by way of the longitudinal channel 42'.

Figure 6:
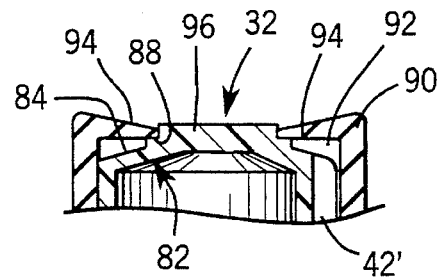
FIG. 6 is a longitudinal cross section to a larger scale through part of the apparatus indicated by the outline VI in FIG. 5.

In order that the medium 12 propelled out of the container 14 by way of the delivery outlet 32 can be completely wiped away, leaving no residue, the central surface 86 of the end wall of the projection 70 and the annular closing flap 90 complement one another such that in the closed position their surfaces are flush with one another and lie in approximately in the same plane. For this purpose, the inner edge 94 of the closing flap 90 rests on the annular step 88, as shown in FIG. 6, securely sealing the opening. In this regard it is advantageous for the closing flap 90 to be under an initial tension in the closing direction, to additionally improve the sealing action.

To further assist the complete removal of the medium from the delivery outlet, the central surface 86 and the closing flap 90 are so arranged that the plane they define is slightly concave. The medium can then be more easily wiped away with a finger.

As shown in FIGS. 1 and 2, the operating key 36, which in the region 60 is coupled to the cap element 34, is additionally connected to the cap element 34 by means of a frangible strip 96 disposed approximately diametrically opposite the coupling or the region 60. The strip 96 breaks away from the cap element 34 and/or the operating key 36 the first time the operating key 36 is depressed. In this way the state of the strip 96 indicates whether the device 10 has been used or is still unused.

Within the container 14 is located the flexible bag 98 to receive the semifluid medium 12. The bag 98 lines the container 14 and is attached to the container 14 adjacent to or in the region of the container opening 16, for example by heat-fusion, welding-on or the like. This arrangement ensures both that after the container has been filled, the semifluid medium 12 cannot come into contact with the surrounding surfaces and that the medium 12 can be completely or at least nearly completely dispensed from the container 14 or from the flexible bag 98 owing to the collapse of the latter to compensate for a reduction of pressure within it. The non-return valve 30, which comprises openings 100 in the closure element 38 and an approximately annular closing flap 102 over these openings, is therefore continually in contact with or immersed in the semifluid medium 12. Owing to the pressure reduction that builds up within the flexible bag 98 when the pump 22 is operated, the flexible bag 98 collapses, so that the non-return valve 30 remains immersed in the semifluid medium 12 until the latter has been completely dispensed.

To assist in the collapse of the flexible bag 98, its outer surface 108 or at least a part thereof communicates with the exterior. In this illustrated embodiment, a space 104, bounded by the inner surface 106 of the inner shell 18 of the container 14 and the outer surface 108 of the flexible bag 98, communicates with the exterior. In particular, the space 104 bounded by the inner surface 106 of the container 14 and the outer surface 108 of the flexible bag 98 communicates with the exterior by way of an air intake channel 110 that extends through the wall of the container 14. The channel 110 passes between the outer surface 112 of the inner shell 18 and the inner surface 114 of the outer shell 20 of the container 14 and opens into a freely accessible air intake opening 118 at the outer surface 116 of the container 14.

In order that the pressure distribution within the space 104 between the inner surface 106 of the container 14 and the outer surface 108 of the flexible bag 98 is as uniform as possible, the air intake channel 110 communicates with the space 104 through an opening in the wall of the container 14 in the region of the floor 120 of the latter approximately centered on the long axis 122 of the container 14.

To ensure that the volume within the bag is initially completely filled, it has proved advantageous to fix the flexible bag 98 within the inner shell in such a way that the wall of the bag is closely apposed to the inner surface of the inner shell 18 on all sides. For this purpose, the bag 98 is preferably attached to the inner shell 18, e.g. by adhesive, at least in the corner region of the bottom. The fixation or adhesion is however sufficiently weak that it does not impede the collapse of the bag 98 as medium is dispensed.

The flexible bag 98 is preferably impermeable to water and/or gas, so as to increase the keeping time or shelf-life of the semifluid medium 12 contained within the flexible bag 98. For this purpose the flexible bag 98 is made of plastics or equivalent material and/or comprises at least one sheet-like layer, for example with a thickness of 0.1 to 0.02 mm. It is advantageous for the flexible bag 98 to be composed of three sheet-like layers (not shown). Here the inner layer would consist of a PET (polyethylene terephthalate) compound, the middle layer of EVOH (ethylvinyl alcohol) and the outer layer, which would be welded onto the container 14 in the region of the container opening 16 or at the rim 24 of the container opening 16, of polyethylene or similar weldable material. As the semifluid medium 12 is dispensed from the flexible bag 98 and delivered through the dosing pump 22, air is reliably prevented from entering, so that the flexible bag 98 gradually collapses until the semifluid medium 12 has been completely dispensed.

The manner in which the apparatus operates to dispense the semifluid medium 12 in controlled doses will now be briefly described with particular reference to FIGS. 3 to 6.

When the apparatus 10 is used, almost 100% of the semifluid medium 12 within the pump chamber 28 is forced out by movement of the diaphragm 40 when the operating key 36 is pressed inward or down into the delivery position of the dosing pump 22, as shown by arrow 124 in FIG. 3. In this way the semifluid medium 12 passes through the delivery channel 42 and the longitudinal channel 42' into the annular delivery channel 92. Due to the pressure that is thereby built up, the edge of the closing flap 90 on the sleeve 76 is lifted away from the annular step 88 of the projection 70. The semifluid medium thus moves out of the container as shown by the arrows 126.

Figure 5:
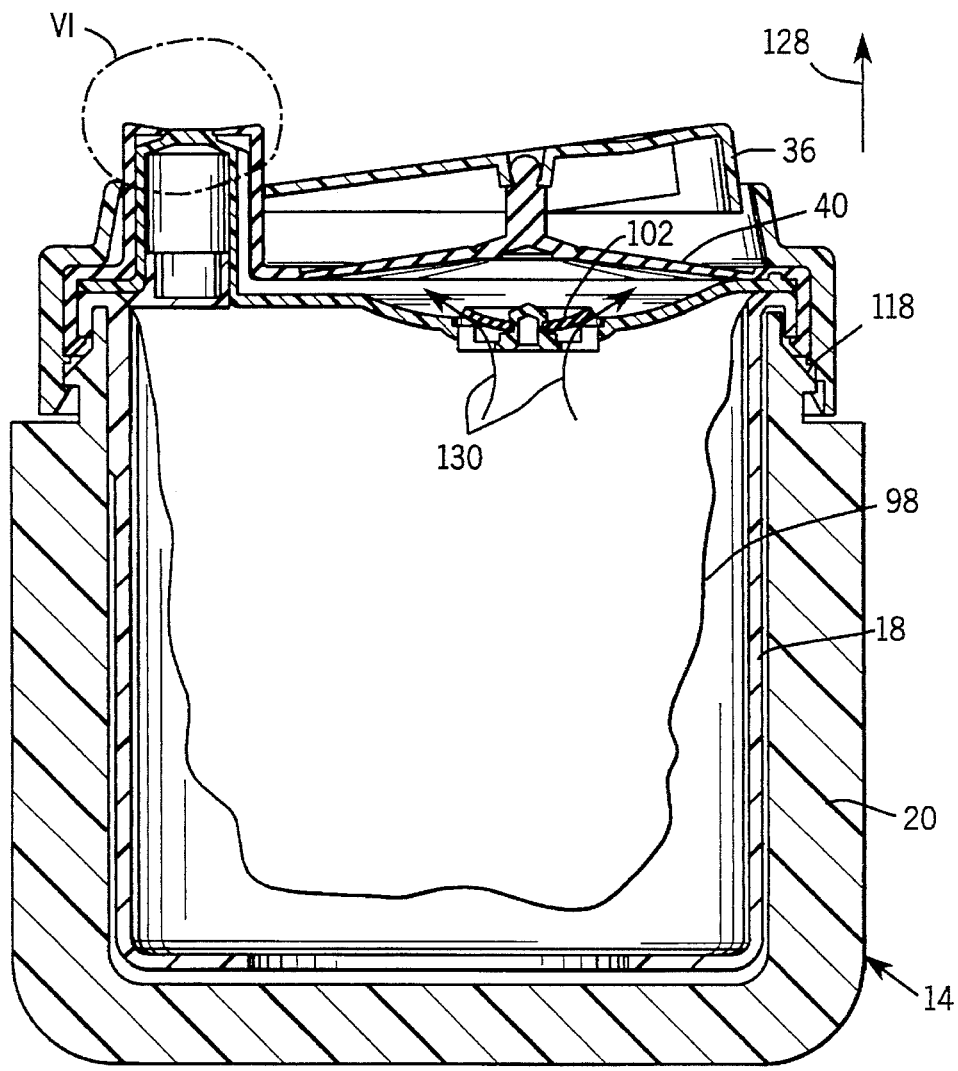
FIG. 5 is longitudinal cross section similar to FIG. 1 of the apparatus in a closed position after it has been put into use.

As shown in FIGS. 5 and 6, the operating key 36, and with it the diaphragm 40, then moves back into the closed position as shown by arrow 128. A vacuum is thereby created in the pump chamber, which causes the semifluid medium 12 contained within the flexible bag 98 to be sucked into the pump chamber 28 through the opening 100 of the non-return valve 30, the closing flap 102 being raised, as indicated by the arrows 130. At the same time, the flexible bag 98 collapses by an amount corresponding to the volume of semifluid medium 12 that has been transferred into the pump chamber 28. Because in the meantime the closing flap 90 on the sleeve 76 has again come to rest on the annular step 88 of the projection 70, the semifluid medium 12 that has been dispensed can conveniently be wiped away from the plane defined by the closing flap 90 and the central surface 86 of the projection 70, using a finger or the hand. The closing flap 90 guarantees that the interior of the container, in particular the pump chamber 28, is securely sealed off from the exterior. Therefore the semifluid medium 12 will keep for a particularly long time.

Figure 7:
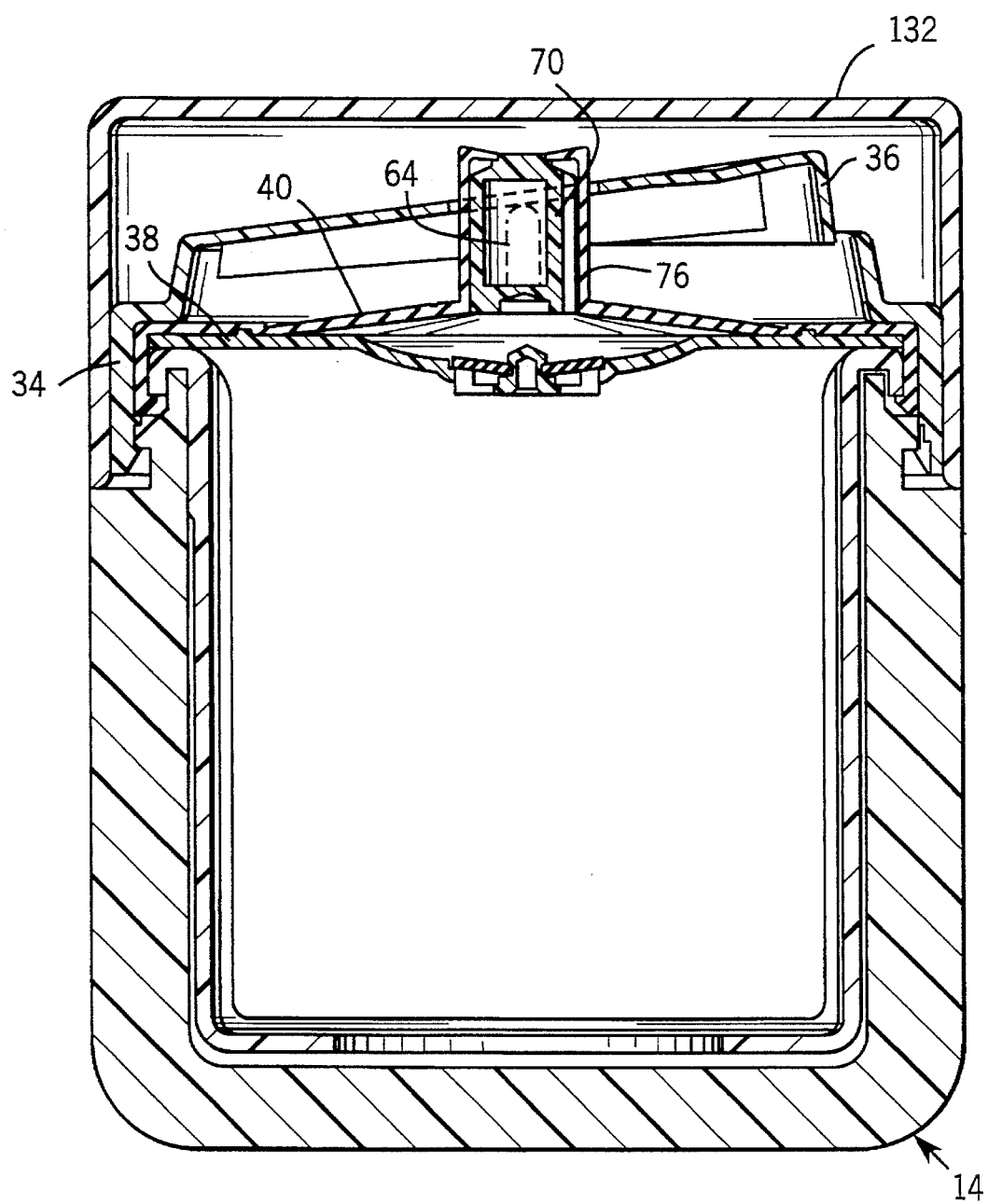
FIG. 7 is a longitudinal cross section of a second embodiment of a dispensing apparatus according to the present invention before it has been put into use.

The second embodiment in accordance with the invention as shown in FIG. 7 differs from the first shown in FIGS. 1 to 6 only in that the delivery outlet 32 or the projection 70 with associated sleeve 76 is positioned centrally. Hence the same components are indicated by the same reference numbers.

Here, the apparatus 10 is also provided with a protective cap 132 covering the dosing pump 22, which reliably prevents an undesired impression or depression of the operating key 36 and hence an undesired delivery of semifluid medium 12 from the container 14 or the flexible bag 98.

What is claimed is:

1. An apparatus for dispensing a semifluid medium comprising a container for said semifluid medium with a rim defining an opening, a flexible bag lining said container to receive the semifluid medium and attached to said container adjacent said rim, a manually operable dosing pump comprising a pump body including a closure means and a diaphragm connected to form a pump chamber having an inlet located within said closure means and a delivery outlet, said pump body being attachable to said rim of the container with said closure means overlying said opening, said pump chamber defining a volume which can be changed by forces acting from the exterior of said apparatus and which communicates with the exterior of said apparatus by way of said delivery outlet, a non-return valve located within said inlet of the pump body and exposed to the interior of said bag and opens in a direction towards said pump chamber, a cap operating means overlying said closure means and said diaphragm being coupled to the cap operating means and movable relative to the closure means by said cap operating means, and a delivery channel connecting said pump chamber to said delivery outlet.

2. An apparatus as claimed in claim 1, wherein the cap operating means, the closure means and the diaphragm are attached together to form a single assembly unit of the apparatus.

3. An apparatus as claimed in claim 1, wherein said closure means includes a circumferential edge which is releasably connected to the diaphragm.

4. An apparatus as claimed in claim 1, wherein the diaphragm is snap-fitted to said cap operating means.

5. An apparatus as claimed in claim 1, wherein the dosing pump has a snap fit connection to said rim of the container.

6. An apparatus as claimed in claim 5, wherein said dosing pump body comprises at least one projection member projecting toward the container, and said container includes an annular ridge outward from the container, said at least one projection member and said ridge being constructed to establish said snap-fit connection whereby the dosing pump is attached to the container.

7. An apparatus as claimed in claim 1, wherein the cap operating means comprises a cap portion and an integrally coupled operating key, and wherein the diaphragm is connected to said operating key.

8. An apparatus as claimed in claim 7, wherein the diaphragm comprises a spigot extending substantially perpendicularly therefrom, and wherein the operating key defines a receptacle in which the spigot engages to connect the diaphragm to the operating key.

9. An apparatus as claimed in claim 1, wherein the diaphragm is integrally formed with a cylindrical sleeve which extends outwardly through the cap operating means and which defines said delivery outlet at its outer end, and wherein the closure means comprises a cylindrical projection which extends outwardly through the cap operating means and which is enclosed by said cylindrical sleeve.

10. An apparatus as claimed in claim 9, wherein the cylindrical projection defines a longitudinal channel along its outer periphery for the entire length of the projection and constitutes a connection between said delivery outlet and said delivery channel that connects the pump chamber to the delivery outlet.

11. An apparatus as claimed in claim 9, wherein said cylindrical projection defines an annular bevel, and wherein said cylindrical sleeve comprises an annular flap located at said outer end and bounding said delivery outlet, the annular flap cooperating with said annular bevel to define therebetween an annular delivery aperture.

12. An apparatus as claimed in claim 11, wherein said cylindrical projection defines an end wall which complements said annular flap in such a way that when the apparatus is in a closed position the outer surfaces defined by said end wall and said flap lie flush with one another.

13. An apparatus as claimed in claim 11, wherein said annular flap is formed with an initial tension towards a closed position of said delivery aperture.

14. An apparatus as claimed in claim 1, wherein the cap operating means comprises a cap portion and an operating key which is attached to said cap portion by an integral coupling, and wherein a frangible strip is disposed between said cap portion and said operating key substantially diametrically opposite said coupling and said frangible strip breaking away from at least one of the cap portion and the operating key when said operating key is first depressed on first use of the apparatus.

15. The apparatus of claim 1, wherein said diaphragm includes a tubular sleeve having an outer end wall, said delivery outlet being located and being an opening in said end wall and including a flexible annular flap encircling said opening and said flap being movable outwardly under pressure within said chamber, said closure means includes a member extending outwardly into said tubular sleeve and terminating in an outer end wall abutting said flap to close said opening, said tubular member and tubular sleeve being constructed to form a passageway from the pump chamber to said flap whereby said semifluid medium moves outwardly through said passageway into pressurized engagement with said flap upon operation of said cap operating means to move said flap outwardly and dispense said semifluid medium through said opening.

16. The apparatus of claim 15, wherein said annular flap is constructed with an initial tension urging said flap into engagement with said outer end wall of said member.

* * * * *